(No Model.)　　　　　　　J. WIGAND.　　　　2 Sheets—Sheet 1.
　　　　　　　　　　　　　　WAGON.
No. 462,288.　　　　　　　　　　　Patented Nov. 3, 1891.
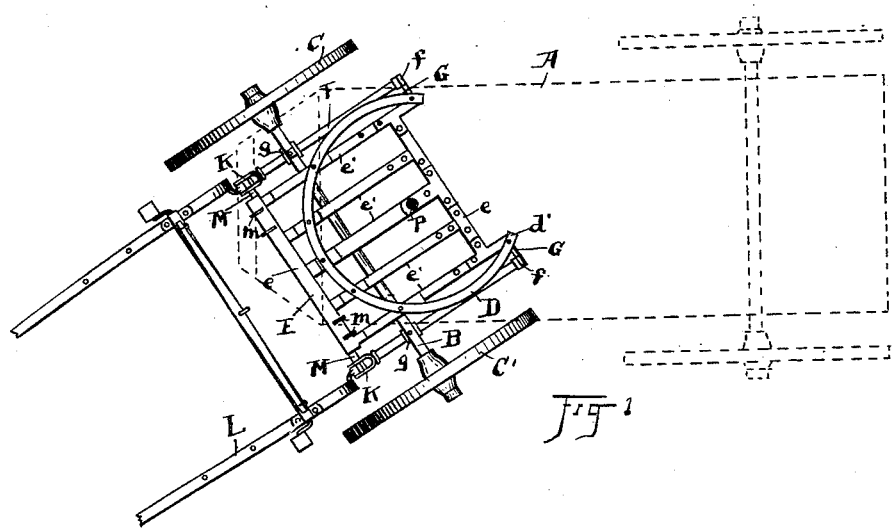
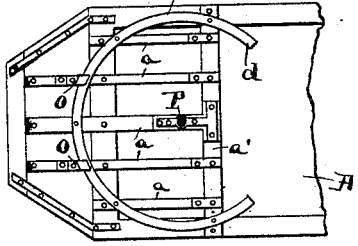
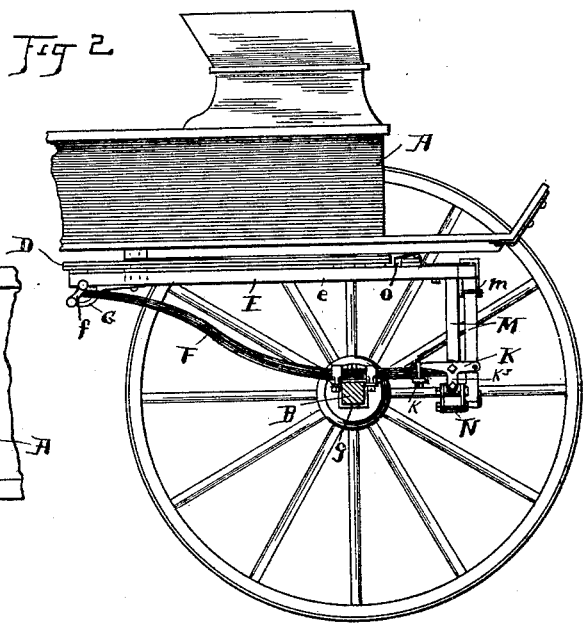
Witnesses
P. B. Moser
Al. J. Symes, Jr.
Inventor
John Wigand
H. T. Fisher Attorney (No Model.) 2 Sheets—Sheet 2.
J. WIGAND.
WAGON.
No. 462,288. Patented Nov. 3, 1891.
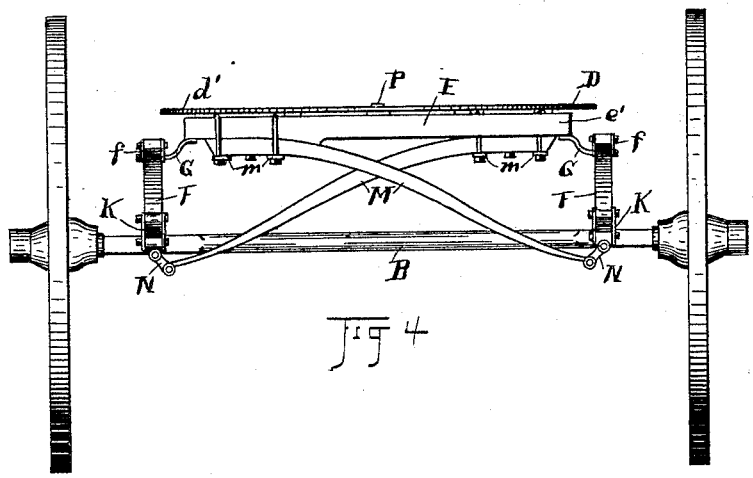
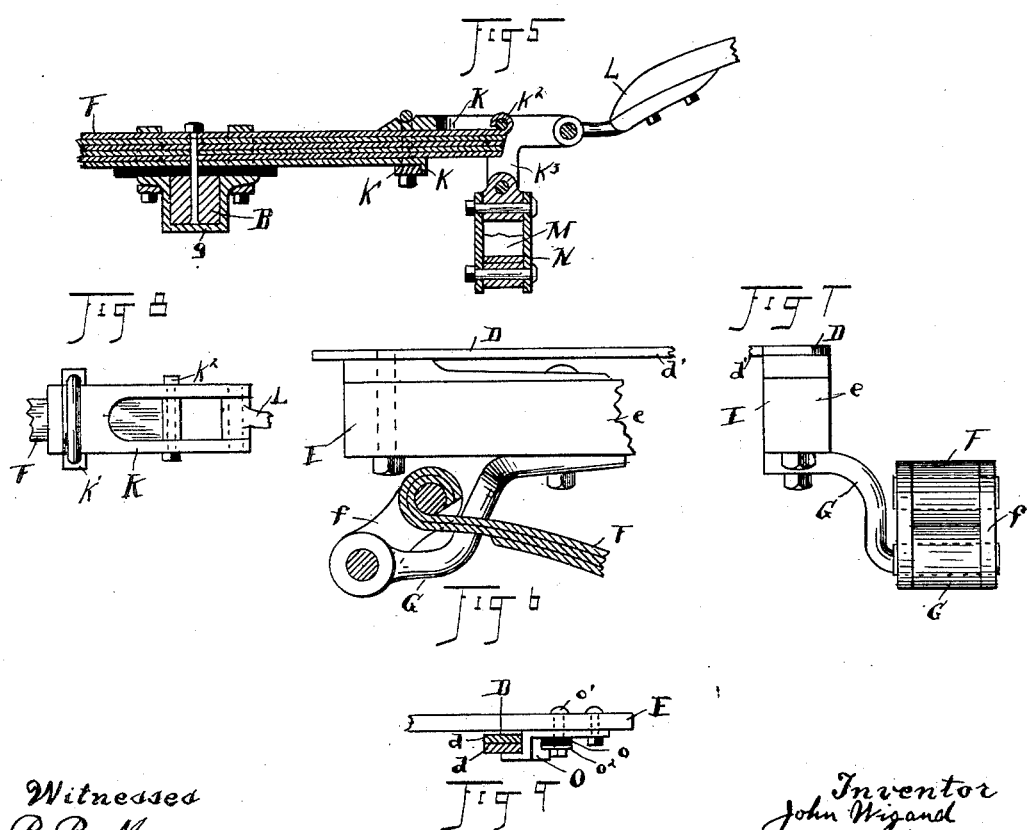
Witnesses
R. B. Moser
Al. J. Symes Jr.
Inventor
John Wigand
H. T. Fisher Attorney

UNITED STATES PATENT OFFICE.

JOHN WIGAND, OF CLEVELAND, OHIO.

WAGON.

SPECIFICATION forming part of Letters Patent No. 462,288, dated November 3, 1891.

Application filed June 16, 1891. Serial No. 396,453. (No model.)

*To all whom it may concern:*

Be it known that I, JOHN WIGAND, a citizen of the United States, residing at Cleveland, in the county of Cuyahoga and State of Ohio, have invented certain new and useful Improvements in Wagons; and I do hereby declare that the following is a full, clear, and exact description of the invention, which will enable others skilled in the art to which it appertains to make and use the same.

My invention relates to improvements in wagons and other like vehicles; and the object of the invention is, first, to provide supports and connections whereby a wide body may be used with relatively high front wheels and set comparatively near to the axle, while at the same time the vehicle is adapted to turn in a narrow street.

The object of the invention is, secondly, to afford a wide support for the body which will maintain its supporting capacity with the same uniform distribution of the load over its surface and without lateral tilting whether the vehicle is going straight ahead or making a short turn.

The object of the invention is, thirdly, to provide a spring-support for the front end of the body which will balance the weight of the load equally on the two front wheels when turning.

The object of the invention is, fourthly, to improve details in the construction of running-gear for vehicles, substantially as shown and described, and particularly pointed out in the claims.

Hitherto in the construction of wagons with wide bodies it has been necessary, in order to enable a short turn to be made, either to use a very low wheel, so that the wheel could turn in under the body, or, if a higher wheel were used, to build the body correspondingly higher above the axle on springs or high bolsters to get the same effect. The latter plan of building is objectionable on many accounts, as every practical wagon-man knows, while low wheels likewise are objectionable. I have therefore constructed a wagon in such a manner that a low wide body brought near to the axle can be utilized with high front wheels. Again, the tendency in the body to tilt laterally when the old fifth-wheel is used is very objectionable, especially when the load is supported on high springs. This tendency is entirely overcome by my construction of a fifth-wheel, which is almost or quite as wide as the body itself and is so supported that tilting is impossible.

A further advantage of my construction is the direct draft I get from the axle, which is brought high enough by the high front wheels employed to make such direct draft practicable. Other material advantages are obtained, as will appear in the detailed description.

In the accompanying drawings, Figure 1 is a plan view of a wagon embodying my improvements and showing the front portion thereof in full lines and the body and the rear portion in dotted lines. Fig. 2 is a side elevation of the front portion of the wagon, and Fig. 3 is a view of the front portion of the body alone looking up from beneath the same and showing only the parts which are permanently fixed to the body. Fig. 4 is a front elevation of the front carriage of the wagon, with the springs and other connected parts in position and with the body removed. Fig. 5 is an enlarged longitudinal sectional view of the forward portion of one of the side springs, showing the manner of connecting the same with the axle and with the shackle for the thills, as well as a cross-section of the knuckle-joint supporting the lower end of the associated front spring. Fig. 6 is a side elevation of the rear end of the fifth-wheel frame, (shown in front elevation in Fig. 4,) and showing the lateral arm which supports the rear end of the corresponding side spring, a section of which is shown on said arm. Fig. 7 is a view looking in from the left of Fig. 6, and showing a section of the frame with the arm attached and the pivoted shackle on the arm for supporting the spring. Fig. 8 is a plan view of the front part of Fig. 5, which shows how the spring is secured to the shackle at that end. Fig. 9 is a view showing a cross-section of the fifth-wheel and the means for holding the sections of the wheel together, the same parts being shown in Figs. 2 and 3.

A represents the wagon or vehicle body. For simplicity in description and claims the word "wagon" is used herein, and when used is understood as covering any vehicle of the general nature of a wagon and in which four wheels and a suitable body are employed. It might be an omnibus or other vehicle not ordinarily included in the term "wagon." The body shown herewith is rectangular and of the full width allowable between the wheels. It will be noticed as a peculiarity of the arrangement that the body does not extend further to the front than the axle B, which leaves room for the outer wheel C in turning to pass the corner thereof, as seen in Fig. 1, and to cut in at the front thereof to make the turn within a small area, as hereinbefore referred to. The inner wheel C' when this occurs takes the position seen in said Fig. 1, and an exceedingly short turn is thus made possible with wheels at the front of much more than the usual relative height. Now, in order that this position of the body of the wagon and the front carriage may be advantageously obtained, it obviously is necessary to provide special and novel connections between them, and such connections are provided in this instance. Thus, to begin with, I employ a fifth-wheel D, composed of upper and lower sections $d$ $d'$, respectively. This fifth-wheel is exceptional in construction in that it has practically as great width as the body of the vehicle, so that, as it is supported firmly at all points where any bearing or pressure from the load occurs, it follows that no tilting or careening of the body or load to either side is at any time possible. To obtain this support for the fifth-wheel, the bottom of the body A is provided with a special frame-work consisting of the strips $a$ and the cross-piece $a'$, and the upper section $d$ is fastened to this frame in any suitable way. The middle strips $a$ preferably extend to the front of the body and are bent upward to support the foot-rest. The lower section $d'$ of the fifth-wheel is suitably secured to a frame E, consisting in this instance of cross-bars $e$ and longitudinal bars $e'$, all duly fastened together and forming a rectangular frame, substantially as seen in Fig. 1. This frame, fashioned as here shown and described or in any equivalent way, is supported on the front axle by means of two sets of springs, one of which runs longitudinally with the body A and the other transverse thereto. Thus the springs F, one on each side, have their rear ends secured to a pivot-shackle $f$, supported on the laterally-projecting arm G, which is bolted on the under side of the frame E at the corner thereof, while the body portion of these springs is fastened by a clip $g$ firmly and rigidly to the axle B. The said side springs extend thence beyond the axle B some distance to the front thereof and have secured thereto the shackles K. The fastening of these shackles to the spring is effected first by bending down the extremity of the lower leaf of the spring, as at $k$, and employing a clip $k'$, which engages the shouldered extremity of the shackle lying on top of the spring. The upper leaf of the spring is turned back to form an eye, through which and the shackle extends a bolt $k^2$, Fig. 8. Thus the shackle is so firmly held that it will sustain the draft of the vehicle, and the thills L are attached directly to its front extremity, as seen in Figs. 5 and 8.

Transversely to the body of the vehicle, at the extreme front of the frame E, are the cross-springs M. The upper ends of these springs are attached to the bottom of the said frame E at the immediate front thereof by clips or their equivalent $m$, and their lower outer extremities are fixed to the knuckle-joint N, pivoted on the hanging portion $k^3$ of the shackle. It will be noticed that the said springs are crossed from side to side, so that the weight that comes on one spring is transferred to the opposite side of the vehicle near to the wheel on that side, while the same is true of the other spring. Thus the weight of the vehicle on each side is carried by the side spring on that side and the cross-spring which has its top end on that side, and as each spring is supposed to be equally efficient they not only equally divide the weight between them, but between the two front wheels as well, and this occurs in like manner and uniformity whether the wagon is going straight ahead or turning. It will also be observed that the side spring F reaches well back beneath the body of the wagon to sustain the weight from that point, instead of taking the weight immediately over the axle, as is usual.

I do not, of course, limit myself to the exact form of the springs shown, nor to the manner of fastening them, as both the form and fastening might be changed and yet keep within the scope of equivalent constructions. If preferred, a lighter spring than here shown at the front may be used by a slight change in the construction and connections; but the principle would be same. These changes or differences would only be resorted to according as the vehicle is of the lighter or heavier style. Thus for a light delivery-wagon a lighter grade of spring would be wanted than for a heavy express-wagon.

In Fig. 9 I show a dog O, secured to the bottom frame of the body and arranged to extend in beneath the fifth-wheel and keep the sections thereof together in good working position. Two of these dogs are used, as here shown; but others may be added if found necessary. To compensate for any slight warp or unevenness in the section of the fifth-wheel, I introduce a rubber or other equivalent yielding material $o$ beneath the dog and in connection with the front securing-bolt $o'$, and a washer $o^2$ and a nut beneath hold the rubber in position and serve to lock the parts as tightly as required.

The coupling or king bolt P extends through the body into the lower frame E, and thus it will be seen throws the turning-point between the front and rear sections of the wagon back a considerable distance from the front axle and away from the place where the weight of the load is supported.

Having thus described my invention, what I claim as new, and desire to secure by Letters Patent, is—

1. A horizontal supporting-frame and the front axle beneath the same, side springs fixed on the said axle and to said frame, and front cross-springs secured to said frame at one end and supported in front of the said axle at the other end, substantially as described.

2. The front axle and the frame for supporting the fifth-wheel above said axle, the side springs connecting said frame and axle and extending forward of the axle, and front springs supported at one end on said side springs and at the other attached to said frame, substantially as described.

3. The front axle, the side springs fixed thereto and having shackles at their forward ends, front springs supported on said shackles, and a top frame to which the upper ends of the said side and front springs are secured, substantially as described.

4. The front axle, the side springs fixed thereto, and shackles secured to the front ends of said springs, said shackles constructed to connect the thills, in combination with cross-springs supported on said shackles, and a frame to which the upper ends of said several springs are secured, substantially as described.

5. A horizontal frame for supporting the front of the wagon-body and side springs supported on the front axle near their front ends and attached to the said frame at their rear ends, in combination with a pair of front springs attached at their upper ends to the said frame and crossed and attached at their lower ends to the end of the opposite side spring in front of the axle, substantially as described.

6. The front carriage having a horizontal frame carrying the fifth-wheel, side springs fixed to the said frame and to the axle and having spring ends extending to the front of the axle, and cross-springs fixed to the front ends of the side springs and to the front corners of the said frame, in combination with a wagon-body coupled to the said horizontal frame at the rear portion thereof, and shackles at the union of the side and front springs to attach the thills or draft-pole, substantially as described.

Witness my hand to the foregoing specification this 11th day of June, 1891.

JOHN WIGAND.

Witnesses:
H. T. FISHER,
NELLIE L. MCLANE.